Patented Sept. 28, 1943

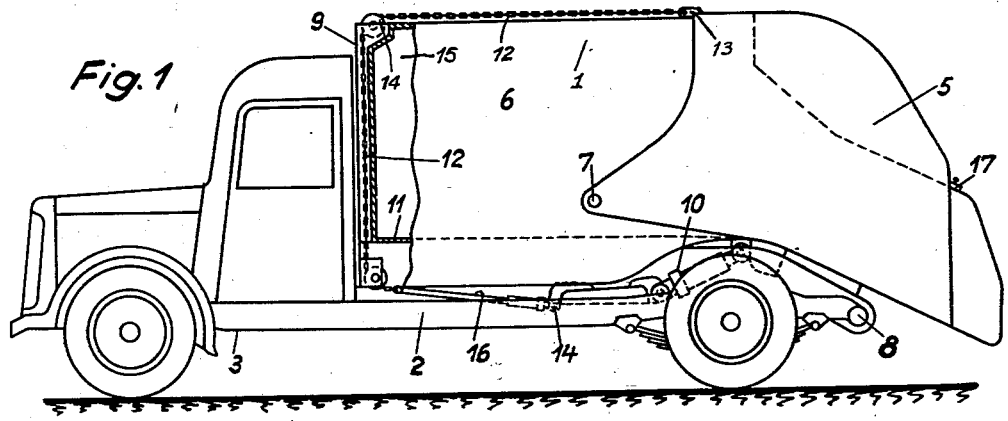
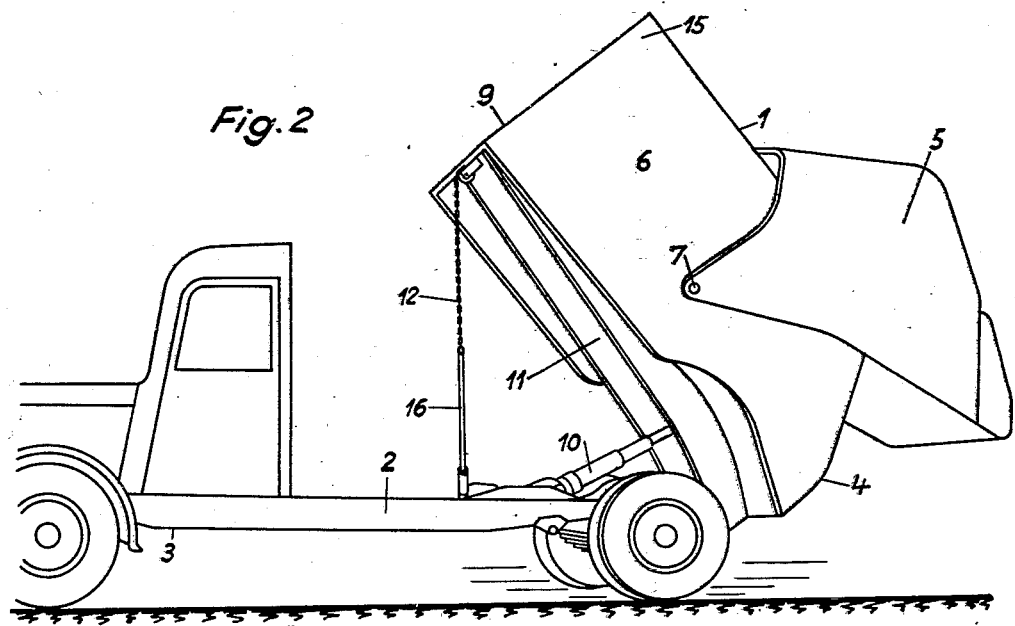
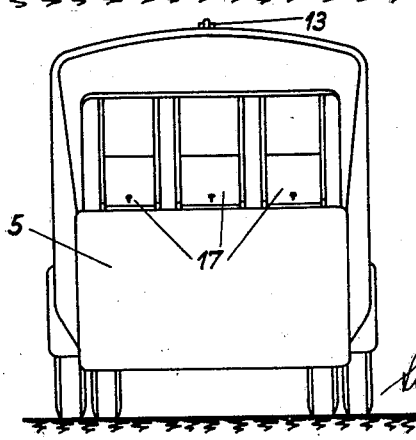

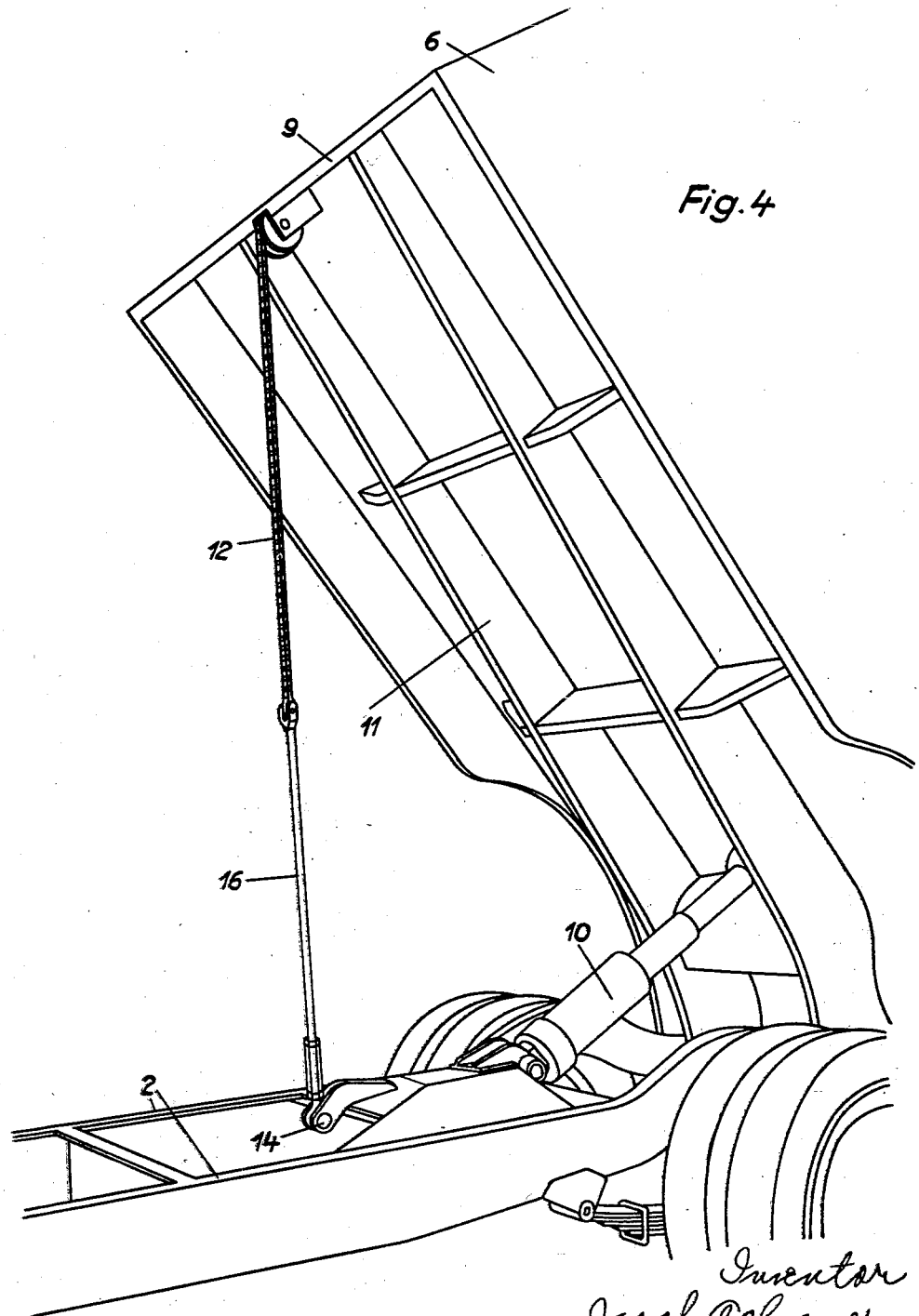

2,330,614

UNITED STATES PATENT OFFICE 2,330,614

REFUSE COLLECTING VEHICLE

Jacob Ochsner, Zurich, Switzerland

Application July 10, 1941, Serial No. 401,825
In France September 27, 1940

2 Claims. (Cl. 298—23)

The invention relates to improvements in refuse collecting vehicles and more particularly to the enclosed type employed for loading, hauling and dumping the refuse.

The invention relates still more particularly to refuse collecting vehicles of the said type having a truck body adapted to receive the refuse, the rear wall of which forms a gate to discharge the refuse by tilting the truck body about a horizontal axis at the rear end of the chassis of the vehicle.

The main object of the invention consists in the provision of a simple and efficient device to open the said gate automatically, while the truck body is being tilted to discharge the load.

Other objects and features of novelty of my invention will be either specifically pointed out or will become apparent when referring for a better understanding of my invention to the following description taken in conjunction with the accompanying drawings, wherein Fig. 1 is a view in side elevation of a vehicle having the tipping device embodying the features of my invention.

Fig. 2 is a side elevation of the vehicle the body being shown in a dumping position.

Fig. 3 shows a back view of the vehicle.

Fig. 4 is an enlarged broken perspective view showing the tipping gear.

The vehicle body 1 is mounted on a chassis 2 of a truck 3. The body 1 is of the enclosed type employed for loading, hauling and dumping of refuse. The rear wall 4 of the body is sloped. A gate or hood 5 is secured to the side walls 6 of the body 1 on pivots 7. The hood 5 encloses the rear of the body 1 and is swung upwardly when the refuse in the body 1 is to be dumped (Fig. 2). The body 1 is rotatably mounted on the chassis 2 at the rear end thereof. To cause the body 1 to rotate about its horizontal axis 8, to raise its front end 9 and permit the refuse to pass out of the body, a hydraulic cylinder acting as a hoist 10 is provided. The latter is arranged between the chassis 2 and the bottom 11 of the body 1. Its construction and its functions in combination with vehicles of this type are well known per se. At the upper edge of the hood 5 the one end of a chain 12, or a steel wire cable or the like, is fastened at 13. The chain 12 is led over a pulley 14 rotatably mounted at the upper edge 15 of the body 1. The other end of chain 12 is fixed to a cross bar 14 of the chassis 2 of the truck, Fig. 1, by means of a rod 16 attached to the end of the chain. A guide roller 15 is provided for the chain 12 at the lower edge of the body 1. The hood 5 carries three loading devices 17 in which the refuse is disposed from the dustbins or other domestic containers and automatically packed into the body 1.

If the hoist 10 is extended to cause the body 1 to rotate about its axis 8 to raise its front end, the hood 5 is automatically swung open, turning on its pivots 7, the chain 12 drawing the hood 5 into the position shown in Fig. 2.

The pivots 7 for the hood are placed with reference to the axis 8 of the body in such a manner that by lifting the forepart of the body, the hood 5 is at once swung out of its closing position and will be fully opened.

It will be understood that I have described and shown the preferred forms of my invention only as examples of the many possible ways to practically construct the same and that I may make such changes in the general arrangement and in the construction of the minor details thereof as come within the scope of the appended claims without departure from the spirit of my invention and the principles involved.

Having thus described my invention, what I claim as new and desire to secure by Letters Patent is:

1. In a vehicle of the character described, the combination of a chassis, a vehicle body pivotally secured to the rear end of the chassis, a hood for closing the rear end of the body and pivoted to said body forward of the pivotal axis of the body, a hoist between the chassis and the bottom of the body, and a flexible member being at one end secured at a fixed point of the chassis forward of the attachment of the hoist to the body and being connected with the hood between the side walls thereof rearward of the pivotal attachment of the hood to the body and means for permanently guiding the flexible member in front of the front wall of the body.

2. In a vehicle of the character described, the combination of a chassis, a body pivotally secured to said chassis at its rear end, a hood for closing the rear end of the body pivotally secured to said body forward of the pivotal axis on which said body is connected with the chassis, a hoist between the chassis and the body, and a flexible member connected at one end with the chassis forward of the pivotal connection of the body with the chassis and also connected with the hood at the top and between the sides of the hood rearward of the pivotal connection of the hood with the body, said flexible member being guided over the top and along the closed front wall of the body, whereby said flexible member is protected against contact with the load material during transport loading and unloading operations.

JACOB OCHSNER.